(12) United States Patent
Paez

(10) Patent No.: US 7,303,596 B2
(45) Date of Patent: Dec. 4, 2007

(54) DISPOSABLE FUEL PACK

(76) Inventor: Delfin E. Paez, 51 Jackson Rd., Bedford, NY (US) 10506

(*) Notice: Subject to any disclaimer, the term of this patent is extended or adjusted under 35 U.S.C. 154(b) by 537 days.

(21) Appl. No.: 10/746,368

(22) Filed: Dec. 29, 2003

(65) Prior Publication Data
US 2005/0139205 A1    Jun. 30, 2005

(51) Int. Cl.
*C06C 5/00* (2006.01)
*C10L 5/36* (2006.01)

(52) U.S. Cl. .................. 44/519; 44/530; 44/541; 44/542; 44/543; 44/534

(58) Field of Classification Search .............. 44/519, 44/530, 541, 542, 545, 534
See application file for complete search history.

(56) References Cited

U.S. PATENT DOCUMENTS

| | | | |
|---|---|---|---|
| 148,734 A * | 3/1874 | Mefford | 44/519 |
| 626,308 A * | 6/1899 | Skiles et al. | 44/534 |
| 2,107,054 A * | 2/1938 | Haymond | 44/519 |
| 2,475,766 A | 7/1949 | Williams | |
| 2,666,695 A * | 1/1954 | Brody | 44/541 |
| 2,811,428 A * | 10/1957 | Smith | 44/519 |
| 3,706,540 A | 12/1972 | Stanton | |
| 3,988,121 A | 10/1976 | Leveskis | |
| 4,179,270 A * | 12/1979 | Clayton et al. | 44/541 |
| 4,272,252 A * | 6/1981 | Altman | 44/502 |
| 4,596,584 A | 6/1986 | Darby | |
| D296,686 S | 7/1988 | Quillin | |
| 5,244,472 A | 9/1993 | Simmons | |
| 5,830,245 A * | 11/1998 | Raddon | 44/544 |

* cited by examiner

*Primary Examiner*—Cephia D. Toomer

(57) ABSTRACT

A fuel pack for igniting charcoal includes an elongated member formed from combustible material that includes an elongated wick passing through it. Advantageously, the ignitable member and wick are saturated with a non-petroleum oil for providing a catalyst to ignite the fuel pack. The fuel pack further includes a package for receiving and storing the ignitable member. The package includes an open end for moving the ignitable member into and out of the package. The package further includes a sealed end portion for maintaining the ignitable member at a substantially stable position.

15 Claims, 4 Drawing Sheets

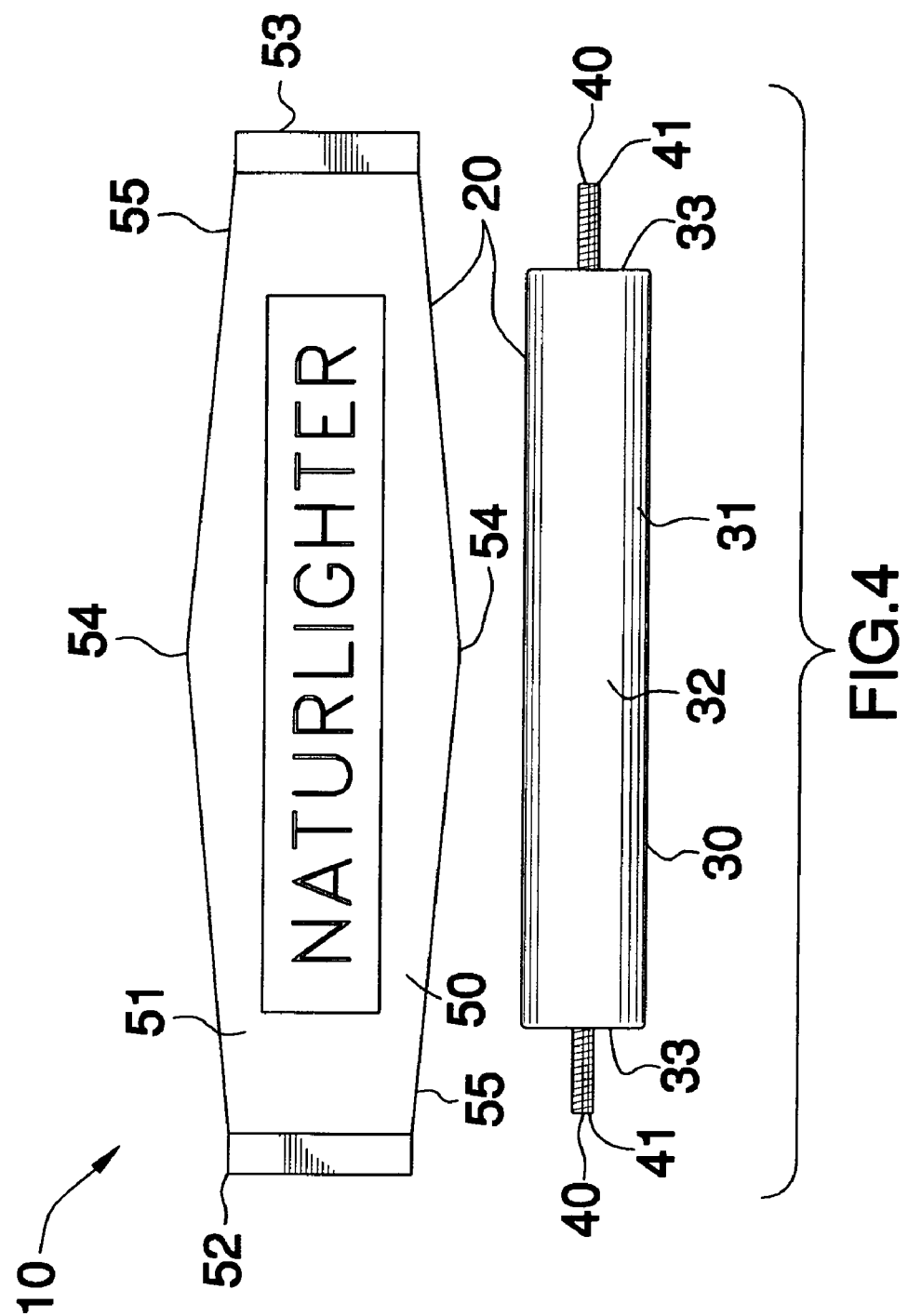

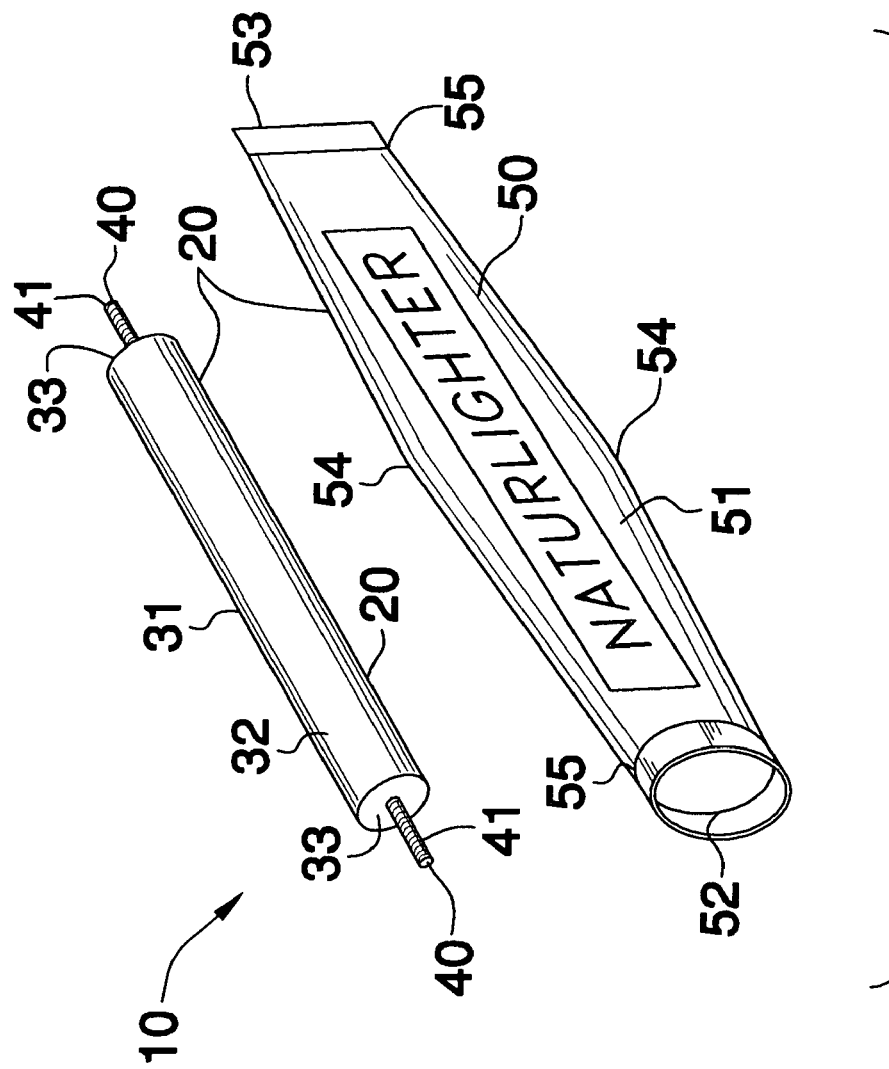

DISPOSABLE FUEL PACK

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a fuel pack and, more particularly, to a disposable fuel pack for igniting charcoal.

2. Prior Art

Various types and combinations of petroleum products are used as starter fuels for charcoal, wood and other fuels, which burns quite completely, but is highly flammable and can be extremely dangerous. In some cases the petroleum starter fuel may only partly impregnate the edges of charcoal, which then burns incompletely, causing a petroleum odor that penetrates the cooked food. Explosive burning can result when these liquid petroleum starters, which have a low flash point, are sprayed on hot coals. Severe burning and in some cases death has resulted from the use of such liquid fire starter products.

Other types of charcoal and wood starters have been developed that are less dangerous, some of which consist of wax impregnated sawdust, wood or fiber particles. These starters are usually more costly to produce and can impart a waxy odor and taste to food if incompletely burned.

Accordingly, a need remains for a safe and affordable disposable fuel pack that overcomes the above-noted shortcomings.

BRIEF SUMMARY OF THE INVENTION

In view of the foregoing background, it is therefore an object of the present invention to provide a disposable fuel pack. These and other objects, features, and advantages of the invention are provided by a disposable fuel pack for preferably igniting charcoal. Such a fuel pack includes an elongated member formed from combustible material and includes a preferably cylindrical body that has a centrally disposed longitudinal axis and an outer surface radially spaced therefrom and extending along a length of the body. The body includes oppositely spaced end portions that define a length of the body therebetween. The body, which is preferably formed from paper material, may advantageously be soaked with cooking oil. Of course, other flammable and non-petroleum oils may be employed without departing from the true scope of the invention.

The present invention further includes an elongated wick disposed within the body and passes therethrough generally parallel to the axis. The wick includes oppositely spaced end portions preferably extending outwardly from the body that are adjacent to the opposed end portions of the body. The wick is preferably formed from paper material and may advantageously be saturated in cooking oil or other conventional flammable oils, as well known to a person of ordinary skill in the art.

The present invention further includes a package for receiving the ignitable member therein and for storing same during non-operating conditions. The package includes an outer surface and a preferably annular open end portion integral therewith, for selectively moving the ignitable member therethrough. The package further includes a sealed end portion oppositely spaced from the open end portion for advantageously maintaining the ignitable member at a substantially stable position. The package may also include a central portion that has a larger width than respective widths of the end portions of the package.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 4 is a top plan view of the fuel pack shown in FIG. 1; and

FIG. 5 is a perspective view of the fuel pack shown in FIG. 1.

DETAILED DESCRIPTION OF THE INVENTION

Figure 1:
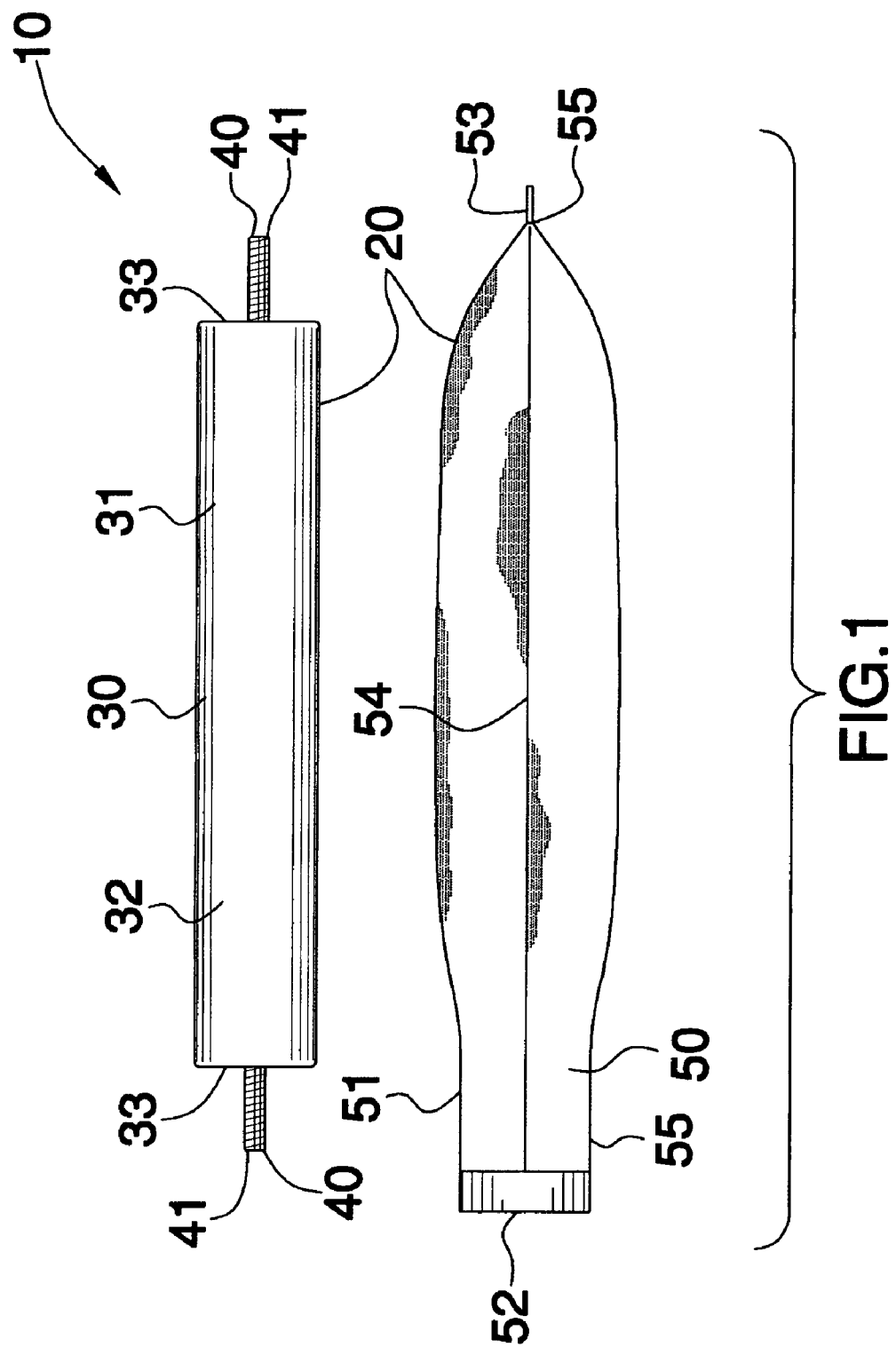
FIG. 1 is a side elevational view showing a disposable fuel pack, in accordance with the present invention.
Figure 2:
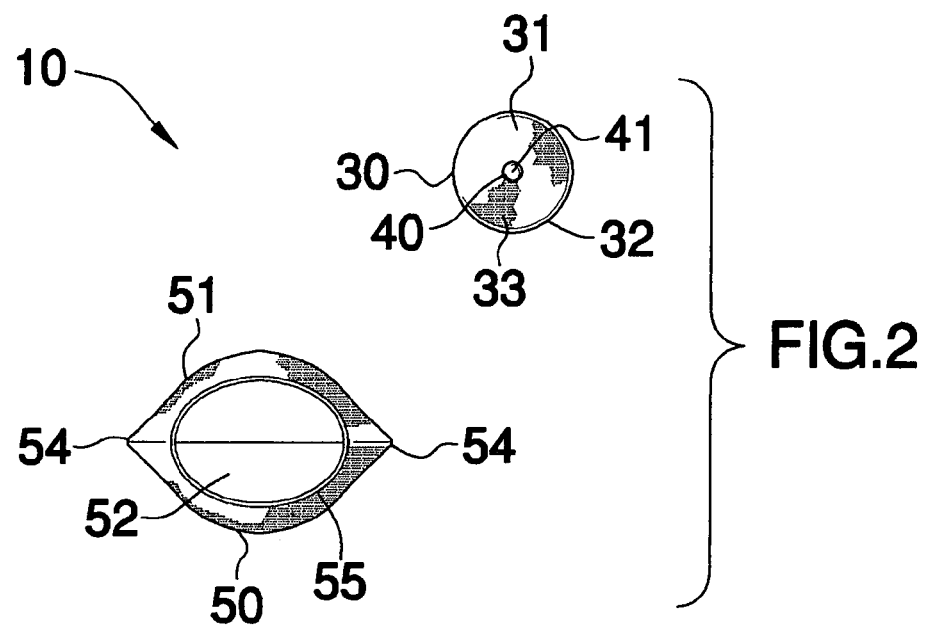
FIG. 2 is a front-end view of the fuel pack shown in FIG. 1.
Figure 3:
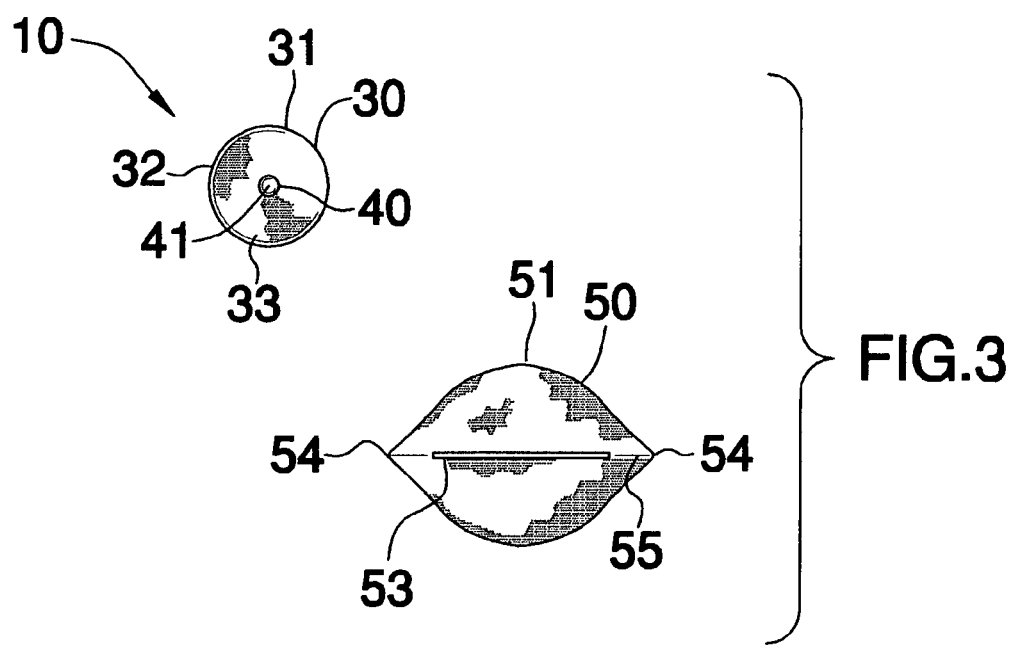
FIG. 3 is a back-end view of the fuel pack shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-5 by the reference numeral 10 and is intended to provide a disposable fuel pack. It should be understood that the apparatus 10 may be used to ignite many different types of materials and therefore should not be limited to igniting only charcoal.

Referring initially to FIG. 1, the present invention 10 includes a disposable fuel pack 20 for igniting charcoal. Such a fuel pack 20 includes an elongated member 30 formed from combustible material and includes a cylindrical body 31 that has a centrally disposed longitudinal axis and an outer surface 32 radially spaced therefrom and extending along a length of the body 31. The body 31 includes oppositely spaced end portions 33 that define a length of the body 31 therebetween. The body 31, which is formed from paper material, is soaked with cooking oil. Of course, other flammable and non-petroleum oils may be employed without departing from the true scope of the invention.

The present invention further includes an elongated wick 40 disposed within the body 31 and passes therethrough generally parallel to the axis. The wick 40 includes oppositely spaced end portions 41 extending outwardly from the body 31 that are adjacent to the opposed end portions 33 of the body 31. The wick 40 is formed from paper material and is saturated in cooking oil or other conventional flammable oils, as well known to a person of ordinary skill in the art.

The present invention further includes a package 50 for receiving the ignitable member 30 therein and for storing same during non-operating conditions. The package 50 includes an outer surface 51 and an annular open end portion 52 integral therewith, for selectively moving the ignitable member 30 therethrough. The package 50 further includes a sealed end portion 53 oppositely spaced from the open end portion 52 for advantageously maintaining the ignitable member 30 at a substantially stable position. The package 50 also includes a central portion 54 that has a larger width than respective widths of the end portions 52,53 of the package.

The appealing features of the present invention 10 are its portable and light-weight characteristics as well as its compact size. This apparatus 10 effectively allows a user to ignite charcoal briquettes in a quick, easy and effortless manner. With the fuel pack 10, charcoal would be uniformly ignited and burn more efficiently. The briquettes would cook foods more evenly and perfectly, which would prevent wastage of food products. Advantageously, the present invention does not include petroleum products that can permeate food while positioned on a barbecue grill.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A fuel pack for igniting charcoal and comprising:
   an elongated member formed from combustible material and including a body having a centrally disposed longitudinal axis and an outer surface radially spaced therefrom and extending along a length of said body, said body including oppositely spaced end portions integral therewith and defining a length of said body therebetween;
   an elongated wick disposed within said body and passing therethrough generally parallel to the axis, said wick including oppositely spaced end portions extending outwardly from said body and adjacent to said opposed end portions thereof; and
   a package for receiving said ignitable member therein and storing same during non-operating conditions, said package including an outer surface and an open end portion integral therewith and for selectively moving said ignitable member therethrough, said package further including a sealed end portion oppositely spaced from said open end portion and for maintaining said ignitable member at a substantially stable, position;
   wherein said body is formed from paper material.

2. The fuel pack of claim 1, wherein said body has a substantially cylindrical shape.

3. The fuel pack of claim 1, wherein said body is saturated with cooking oil.

4. The fuel pack of claim 1, wherein said wick is formed from paper material and includes cooking oil saturated therein.

5. The fuel pack of claim 1, wherein said open end portion has a substantially annular shape.

6. The fuel pack of claim 1, wherein said body includes a central portion and oppositely spaced end portions integral therewith, said central portion having a larger width than respective widths of said end portions of said body.

7. A fuel pack for igniting charcoal and comprising:
   an elongated member formed from combustible material and including a body having a substantially cylindrical shape, said body further having a centrally disposed longitudinal axis and an outer surface radially spaced therefrom and extending along a length of said body, said body including oppositely spaced end portions integral therewith and defining a length of said body therebetween;
   an elongated wick disposed within said body and passing therethrough generally parallel to the axis, said wick including oppositely spaced end portions extending outwardly from said body and adjacent to said opposed end portions thereof; and
   a package for receiving said ignitable member therein and storing same during non-operating conditions, said package including an outer surface and an open end portion integral therewith and for selectively moving said ignitable member therethrough, said package further including a sealed end portion oppositely spaced from said open end portion and for maintaining said ignitable member at a substantially stable position;
   wherein said body is saturated with cooking oil;
   wherein said wick is formed from paper material and includes cooking oil saturated therein.

8. The fuel pack of claim 7, wherein said body is formed from paper material.

9. The fuel pack of claim 7, wherein said open end portion has a substantially annular shape.

10. The fuel pack of claim 7, wherein said body includes a central portion and oppositely spaced end portions integral therewith, said central portion having a larger width than respective widths of said end portions of said body.

11. A fuel pack for igniting charcoal and comprising:
   an elongated member formed from paper material and including a body having a substantially cylindrical shape, said body further having a centrally disposed longitudinal axis and an outer surface radially spaced therefrom and extending along a length of said body, said body including oppositely spaced end portions integral therewith and defining a length of said body therebetween;
   an elongated wick disposed within said body and passing therethrough generally parallel to the axis, said wick including oppositely spaced end portions extending outwardly from said body and adjacent to said opposed end portions thereof; and
   a package for receiving said ignitable member therein and storing same during non-operating conditions, said package including an outer surface and an open end portion integral therewith and for selectively moving said ignitable member therethrough, said package further including a sealed end portion oppositely spaced from said open end portion and for maintaining said ignitable member at a substantially stable position;

said body having a unitary shape such that said body burns as a single unit during a combustion process.

12. The fuel pack of claim 11, wherein said body is saturated with cooking oil.

13. The fuel pack of claim 11, wherein said wick is formed from paper material and includes cooking oil saturated therein.

14. The fuel pack of claim 11, wherein said open end portion has a substantially annular shape.

15. The fuel pack of claim 11, wherein said body includes a central portion and oppositely spaced end portions integral therewith, said central portion having a larger width than respective widths of said end portions of said body.

* * * * *